United States Patent [19]
Jefferson

[11] Patent Number: 5,627,554
[45] Date of Patent: May 6, 1997

[54] SEGMENTED DIRECT VOLUME DISPLAY DEVICE AND METHOD

[76] Inventor: Gordon V. Jefferson, 2505 Briarhurst Ct., Simi Valley, Calif. 93063

[21] Appl. No.: 423,372

[22] Filed: Apr. 18, 1995

[51] Int. Cl.$^6$ ............................................. G09G 5/00
[52] U.S. Cl. ............................................. 345/5; 345/6
[58] Field of Search .................... 359/462, 1; 348/42, 348/51, 52; 345/5, 6

[56] References Cited

U.S. PATENT DOCUMENTS

| | | | |
|---|---|---|---|
| 2,762,031 | 9/1956 | Fryklund | 345/6 |
| 3,177,486 | 4/1965 | Crooker. | |
| 3,663,639 | 5/1972 | Harmuth. | |
| 4,078,229 | 3/1978 | Swanson et al.. | |
| 4,881,068 | 11/1989 | Korevaar et al. | 345/6 |
| 5,231,538 | 7/1993 | Anderson. | |

OTHER PUBLICATIONS

R. Don Williams et al., "Direct Volumetric Visualization", Oct. 19–23, 1992, pp. DVV–1 through DVV–9.

*Primary Examiner*—Ulysses Weldon

[57] ABSTRACT

A segmented direct volume display device includes a volume containing a medium, two mutually orthogonal matrices of light guns capable of providing light beams, each matrix outputting light at different wavelengths, a unit for generating images in the volume by selectively activating the light guns, an image being formed at the intersection of two beams, one from each of the two matrices, and a unit for displaying images in different colors in different segments of the volume. The segmented direct volume display device may further include, on display planes of the volume, a filter for blocking out light output from the light guns while allowing viewing of the image. The segmented direct volume display device may also include individual filters, external to the volume, for each segment. The individual filters block out light from images in other segments while allowing viewing of a generated image within a corresponding segment. The selective activation of the light guns may be in response to data from many different sources.

19 Claims, 2 Drawing Sheets

SEGMENTED DIRECT VOLUME DISPLAY DEVICE AND METHOD

BACKGROUND OF THE INVENTION

1. Technical Field of the Invention

The present invention relates to a device and method of segmenting a viewing area of a three-dimensional direct volume display.

2. Description of Related Art

The human visual system uses both physiological and psychological depth cues in determining relative positions of objects in a three-dimensional (3D) scene. Physiological depth cues include convergence, accommodation, binocular disparity, and motion parallax. Psychological depth cues include linear perspective, shadowing, shading, aerial perspective, occlusion, texture gradient and color. Computer graphics display devices render 3D scenes in a two-dimensional (2D) display space, relying on psychological cues to convey depth information. Stereoscopic cathode ray tube techniques which supply different images to the right and the left eye add limited stereopsis and require double rendering of images. Head mounted displays incorporated with the stereoscopic techniques add motion parallax and angles of view, but still require two sets of images and are physically intrusive.

Current 3D display techniques include using wires filling a volume in three space variables and illuminating a voxel in response to the voltage at the intersection of the wires; stacked 2D matrices of light emitting diodes activated by intersecting conductors; intersecting beams from two adjacent orthogonal matrices of light sources onto a medium within the volume which will only emit illumination when both beams are present, and a third orthogonal matrix of beams for returning the medium to its initial state; impinging a coherent light beam on a spinning surface, the volume being created as the surface moves quickly along a curve, typically helical; and illuminating a passive source with a rotating active matrix of light emitting diodes. In particular, U.S. Pat. Nos. 3,177,486, 3,668,639, 4,078,229, and 5,231, 538 are hereby incorporated by reference.

Each of these techniques have their own advantages and disadvantages for particular applications. Most of these techniques are very weak in the area of providing a variety of colors to further encode the information being displayed thereby.

SUMMARY OF THE INVENTION

Accordingly, it is a primary object of the present invention to provide an inexpensive and direct device and method, for segmenting a three dimensional display using the color of the images being displayed to convey additional information to a user.

These and other objects of the present invention are fulfilled by providing a segmented direct volume display device including a volume containing a medium, at least two mutually orthogonal matrices of light guns capable of providing light beams, each matrix outputting light at different wavelengths, a device for generating images in the volume by selectively activating the light guns, an image being formed at the intersection of two beams, one from each of the two matrices, and the generating device displaying images in different colors in different segments of the volume. The generating device includes a device for altering a wavelength output by light guns in at least one of the two mutually orthogonal matrices in accordance with the position of the light gun within the matrix.

The segmented direct volume display device may further include, on display planes of the volume, a filter for blocking out light output from the light guns while allowing viewing of the image.

The segmented direct volume display device may further include individual filters, external to the volume, for each segment, the individual filters blocking out light from images in other segments while allowing viewing of a generated image within a corresponding segment.

The segmented direct volume display device may further include altering a color of an image in response to a predetermined threshold being exceeded and/or flashing an image in response to a predetermined threshold being exceeded.

The segmented direct volume display device may also include a third mutually orthogonal matrix of light guns outputting light at a wavelength different from wavelengths output from the two mutually orthogonal matrices, an image being formed at the intersection of three beams, one from each of the three matrices.

The objects of the present invention are also fulfilled by providing a method of segmenting a three dimensional image including selectively activating a light beam in each of two mutually orthogonal matrices of light guns, each matrix outputting light at different wavelengths, projecting the light beams within an enclosed volume, forming an image at the intersection of two beams, one from each of the two matrices, and generating images in different colors in different segments of the volume. The generating step may include altering a wavelength output by light guns in at least one of the two mutually orthogonal matrices in accordance with the position of the light gun within the matrix.

The segmenting method may further include blocking out light output from the light guns.

The segmenting method as may also include individually filtering light from a corresponding segment to a corresponding user, the individual filtering blocking out light from images in other segments while allowing viewing of a generated image within the corresponding segment.

The segmenting method may further include altering a color of and/or flashing an image in response to a predetermined threshold being exceeded.

The segmenting method may further include selectively activating a light beam in a third mutually orthogonal matrix of light guns, the third mutually orthogonal matrix outputting light at a wavelength different from wavelengths output from the two mutually orthogonal matrices, the forming of an image being at the intersection of three beams, from each of the three matrices.

A further scope of applicability of the present invention will become apparent from the detailed description given hereinafter. However, it should be understood that the detailed description and the specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
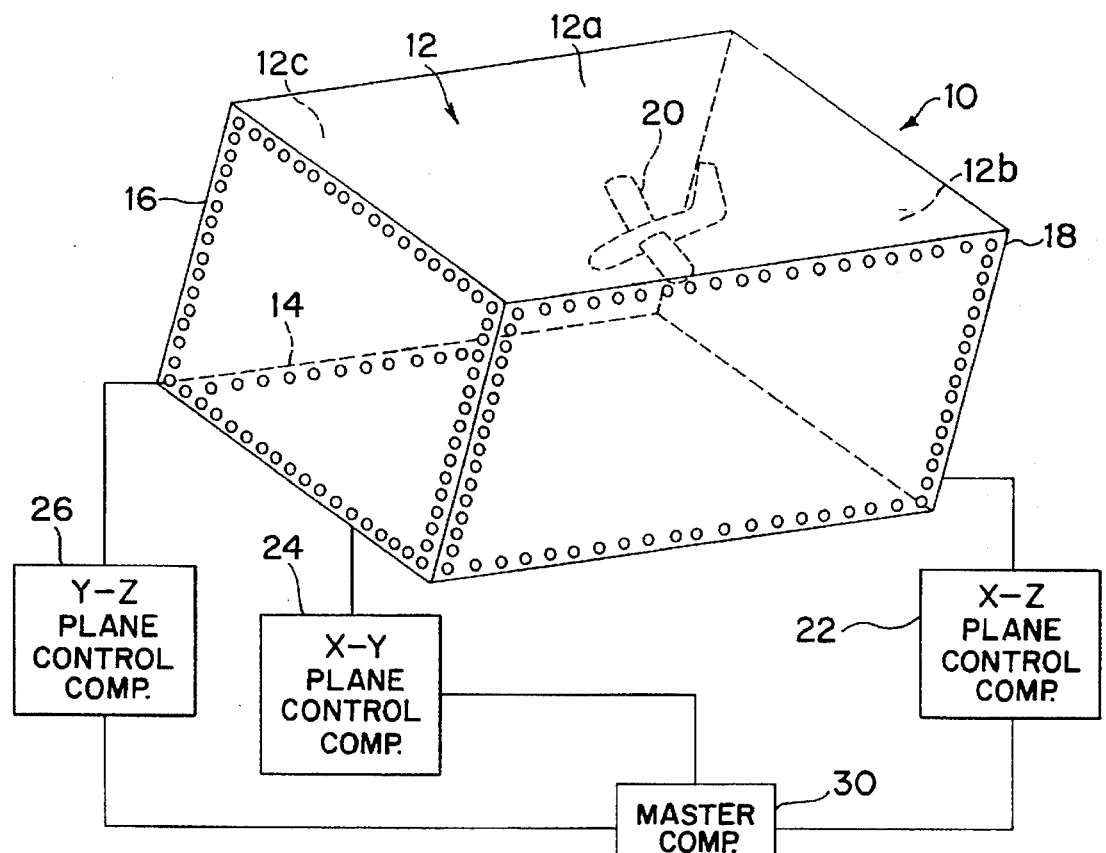
FIG. 1 is an elevational perspective view of the display device of the present invention.

The direct volume display device (DVDD) 10 is shown in FIG. 1. A space volume 12 has three cartesian, mutually perpendicular surface planes. The space volume 12 is preferably filled with a homogeneous vapor, homogenous colloidal suspension gas, or homogeneous clear gelatin. Each of the cartesian planes of the space volume 12 has a corresponding matrix of light guns, an x-y light gun matrix 14, a y-z light gun matrix 16, and an x-z light gun matrix 18. Advantageously, the relative spacing between any two adjacent light guns is a quarter of an inch. The spacing may be achieved using fiber optics. The space volume planes not containing the light gun matrices serve as viewing planes, indicated as 12a, 12b, and 12c.

Figure 2:
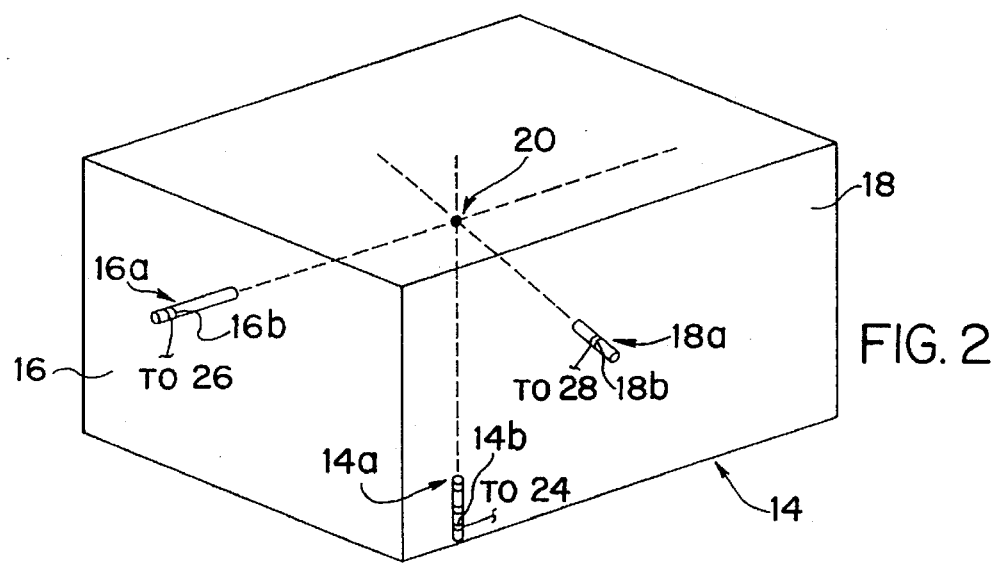
FIG. 2 is an elevational perspective view illustrating the generation of an image of a single point by the device of FIG. 1.

FIG. 2 shows an example of how an individual voxel is illuminated. The x-y light gun matrix 14 provides light in the z direction from light gun 14a, the y-z light gun matrix 16 provides light in the x direction from light gun 16a, and the x-z light gun matrix 18 provides light in the y direction from light gun 18a. A visible point of light 20 is created at the intersection of the three light guns 14a, 16a and 18a. While it is advantageous to use three light guns matrices, thereby providing full position information and greater color variation, in applications where a beam path will rarely intersect another beam path more than once in forming the desired images, only two matrices may be used.

Advantageously, as shown in FIG. 1, each plane 14, 16,18 has a corresponding plane control computer 24, 26, 28 respectively, being fed to a master computer 30. These plane control computers 24, 26, 28 activate the light guns in their respective planes, thus providing the pattern for image projection. Each such plane control computer will have a memory map of all of the binary states, i.e., on-off conditions of each light gun within the corresponding matrix.

Further, as shown in FIG. 2, each laser is fitted with an electronic tuning device 14b, 16b, and 18b. Each of these tuning devices 14b, 16b, 18b is connected to a corresponding one of the control computers 24, 26 and 28 for the appropriate plane. Within the corresponding control computer, a digital value corresponding to a specific analog signal level is stored in a digital register buffer word. The digital-to-analog circuitry within the control computer converts the digital value in the register into a corresponding analog signal level. The resulting analog signal is input to the electronic laser tuning device, which alters the laser output wavelength in accordance with the analog signal. Thus, the laser wavelength is directly proportional to the digital value provided by the corresponding control computer.

Unless the segmented 3D display is being generated by a method which produces a new photon and thus only generates visible light at the intersection of the beams, such as some of the methods mentioned above in the background section, some filtering will have to be applied to the viewing surfaces 12a, 12b and 12c so that the viewer will not be overwhelmed by seeing the fundamental beams as well as their intersection. The filters for the system shown in FIG. 1 may have two alternative configurations discussed below.

First, each viewing surface 12a, 12b, 12c may be coated with a wavelength filter resin which has a narrow center wavelength equal to the primary wavelength of the lasers in a corresponding matrix plane 14, 16, 18, respectively. When the display is segmented, i.e., has a particular color associated with a particular region, the corresponding lasers will be tuned to the desired wavelength. Viewers will also be provided with goggles for only passing the wavelengths of interest for that viewer, as well as any reserved wavelengths that may appear in any sector. Thus, while there will be a faint background view of the beam paths in the viewing sector, the target intersections will be much brighter that the background beam path lines.

Second, alternatively, the exact individual sector boundary projection shape that is to be projected on each surface of the total simulation space volume surfaces is determined. These individual projection shapes are then coated with filter resins which filter out the exact normal viewing projection wavelength for each matrix of lasers, although the filters do allow some of light at this wavelength through. Again, a viewer will have a faint background view of all beams paths in the viewing sector. The target intersections are even brighter relative to the background beam paths in this embodiment, although the required flexibility for a dynamic system sector reconfiguration is lost due to the use of prescribed filter placement.

Thus, for volume which scatter the beam throughout, rather than the use of materials for which light is emitted only where the beams intersect, no portion of the total simulation space volume is absolutely void of beam paths. However, the viewing differential ratio between image and background beam paths can be acceptably obtained.

Movement of a generated image at intersection points 20 is achieved by turning off light guns from a previous location and turning on light guns at a current location. Only when there is a change in position of a particular image by a distance greater than a corresponding matrix increment will the generated image have to be altered. Also, only those light guns effected by any movement will need to be updated.

The light guns used must be collimated so that they will not significantly diverge along their respective beam paths. Preferably lasers serve as the light guns. High power lasers are not required. White light is produced at the intersection point 20 if the three beams are the primary colors. A different color at the intersection point 20 may be formed by altering one or more of the wavelengths of the light guns. It is noted that white light generation is not required by the present invention. All that is required is that the wavelengths output by the light guns can be varied to produce a variety of wavelengths adequate for the number of segments desired and sufficiently separated to allow for viewing segmentation described in detail below. In another embodiment, when specific objects only are of interest, image masks representative of such objects may be placed in front of each light gun. The image is thus generated by the intersection of these masks.

The degree of color control is particularly useful in certain environments, especially decision critical environments and multiple user applications. In a decision environment, objects may appear as one color, e.g., green or white (with a sufficiently different shade for each sector such that the other sectors may be filtered out), if everything is satisfactory with that object, as determined by the master computer 30. If master computer 30 determines that the conditions warrant caution about the object such that the user should be prepared to take possible action, one or more light guns forming the point or points corresponding to that object would have their wavelengths adjusted to alter the appearance of the object, e.g., yellow, thereby visually warning the user. If another threshold is surpassed, as determined by master computer 30, such that immediate action is required by the user relative to the object, one or more of the light beams will again be altered in order to again modify the color of the object, e.g., red, thereby visually warning the user. If the master computer 30 determined that a final threshold has been surpassed and user action is critical, the plane control computers will flash the light beams on and off in, providing a blinking red image for further visual cues to the user. The warning colors may have shades unique to the sectors or may be universal.

Figure 3:
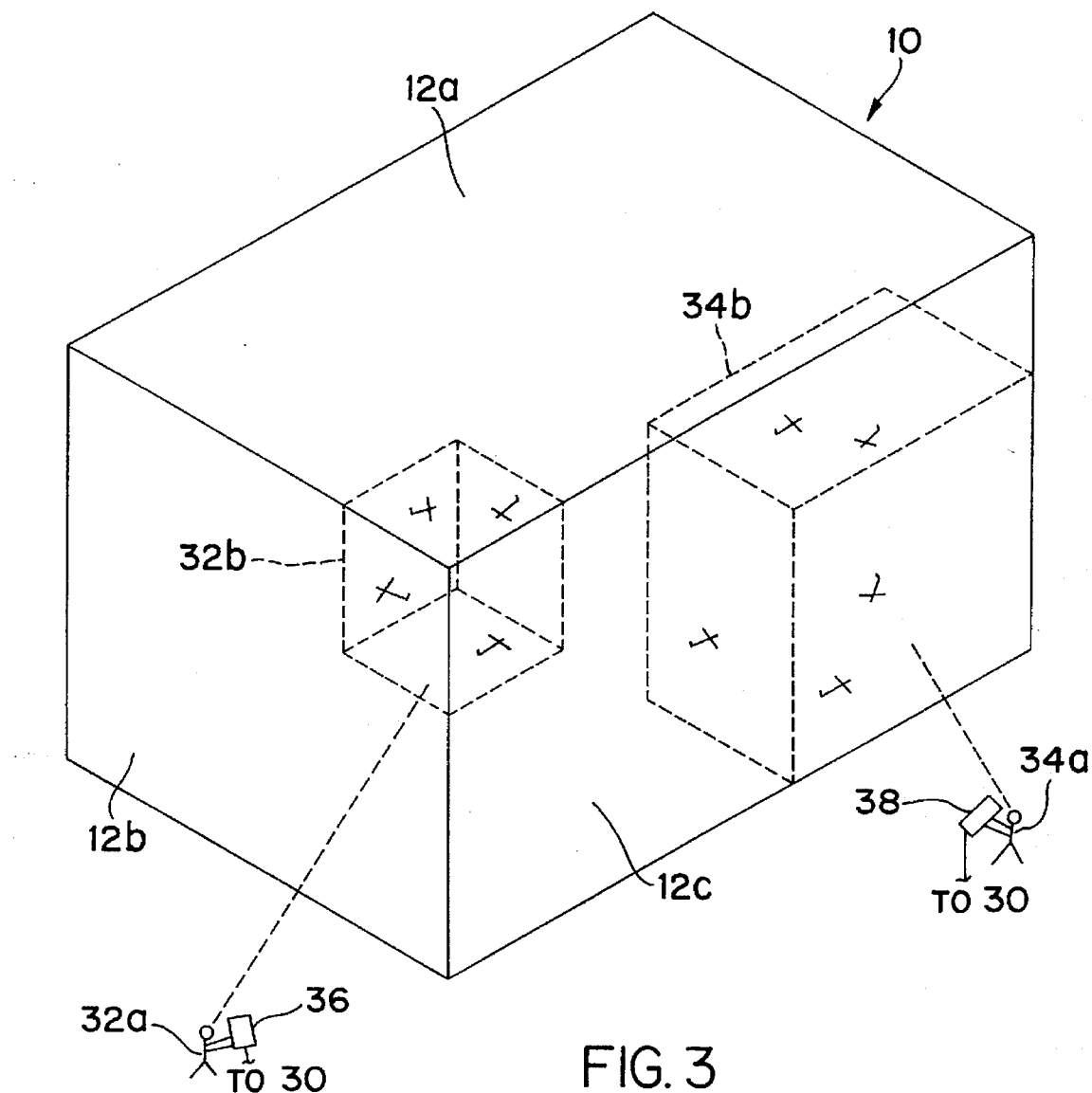
FIG. 3 is an elevational perspective view of the device in FIG. 1 illustrating the segmenting of the volume.

In some applications, e.g., multiple user or images of objects having distinct regions of interest, it is desirable to provide segments within the volume 12 in which the generated images are of different colors. These segments may be predetermined in space or may correspond to particular features of the object being imaged. As shown in FIG. 3, a first user 32a is interested in a segment 32b and a second user 34a is interested in a second segment 34b. If the images generated in segments 32b and 34b are of different colors, then users 32a, 34a may be provided with filtering device, e.g., goggles which filter the generated images of segments that are not of interest. The filter in the goggles may be a pass filter only for wavelengths of interest or a stop filter for wavelengths of other sections. If a user wants to view all of the generated images, the filter need simply be removed. The goggles preferable have the filter hinged at the top of a glasses frame so that the filter can be flipped in and out of position. Alternatively, the filter may be incorporated into a lens similar to bifocal glasses with the lens for viewing the volume display at the top and clear glass for viewing the portable data terminal at the bottom. By selecting a color other than the warning colors for the normal satisfactory object, this segmenting can be incorporated with the warning scheme discussed above.

The attainable color difference range for each sector is a function of either the superposition of the three sections of each plane's wavelength spectrum portion or, when a new photon is being produced, the material's response to different wavelengths. The emergency action colonization in any one sector may bleed through to an adjacent sector when a common beam path is present. By having the color change be a product of all three base wavelengths, the effect of the bleed through can be minimized. If the color bleed through is found to be unacceptable, the warning may be only comprised of flashing the appropriate intersection. For example, flashing could be relied on if a given intersection to be warned about is formed by two beam paths with more than one intersection therealong. When using flashing, if the entire image does not flash in unison, since not all of the constituent lasers are being flashed, the viewer should ignore the warning. Again, the flashing could be suppressed if more than a single intersection is present for two or any beams paths.

One application for which the present invention is particularly well suited is air traffic control. The current two dimensional display equipment being used for the aircraft separation function have a round shaped cathode ray tube scope about two to three feet in diameter. This scope has a radius sweep line rotating upon it. The sweep line rotates at the speed of the antenna of the surveillance radar equipment that provides the target detection signals. There are numerous modes of data representation that can be displayed on the scope surface. The most advanced of the current installed technologies is the ARTS mode of target data representation. The ARTS mode displays the following data for each target aircraft as a single dot in the correct azimuth and distance position. In addition, the ARTS mode displays the following data for each target aircraft in a code format at or near each respective target dot; target altitude, target ground speed, target ID, and target aircraft type, e.g., widebody, heavy, light, etc. This information results in a scope that is very busy and often difficult for a human to assimilate and process. A single controller is often responsible for tracking and recommending the flight path of up to thirty to forty aircraft at any one time using this busy scope. As an alternative to this busy scope, a sector suite display has been proposed. This sector suite includes three two dimensional display screens. One presents the azimuth and distance, one presents the altitude and another provides statistical information for the targets. This may unclutter the screen, but the controller now has to manage three devices.

In the present invention, the master computer 30 can receive radar target data from the existing Air Route Control computers. The master computer 30 will then reformat this information into individual matrix display data formats to be fed to the plane control computers 24, 26, 28. The length of time required to update the entire 3D display will be less than it takes for any radar antenna to rotate the full 360 degrees.

When to be used with air traffic control, the two users 32a, 34a, are provided with a portable textual display terminal 36, 38 respectively, as shown in FIG. 3, to supply descriptive information on each aircraft assigned to a particular user. Each aircraft's unique identification number, aircraft type, altitude, speed, and any other required statistics desired are on the terminal on demand for each aircraft detected in the controlled air space. These display terminals 36, 38 are directly linked to the master computer 30. Advantageously, the unique identification number is displayed adjacent to the image of the aircraft in order to provide a link between the aircraft image and the textual information. The corresponding Id for each aircraft is formed using the intersections of the laser beam paths just as the target aircraft themselves are formed. They will be large so that they are discernable from a distance. The ID will be on the order of as large as their respective aircraft target representations. By using the segmenting and goggles described above, each user will only view information pertinent to an assigned air space, and will not be bothered by extraneous information. Hand off of particular aircraft will be easily accomplished, since the aircraft will no longer be seen by one user as it enters the segment of another user. Further, a user may request straight line be displayed representing the shortest distance between two adjacent aircraft or any two identified aircraft. This straight line will have a color corresponding to either the appropriate user segment color or any warning color.

The 3D display is usable for both terminal and enroute control of aircraft separation applications. Terminal control is the aircraft separation control of aircraft approaching or leaving the airport terminal. Enroute aircraft separation control is the management of the airspace between airport terminal control facilities. All airborne aircraft are controlled/managed at one of these types of control facilities. Enroute control is performed at Air Route Traffic Control Centers (ARTCC). There are twenty one geographically placed ARTCCs across the nation. Terminal Radar Approach CONtrol (TRACON) facility at airports control the airspace defined by a sixty mile radius around a given airport. The following exemplary dimensions are typical for the 3D display to support a terminal control TRACON facility.

A typical display volume supporting a TRACON facility will be twelve feet by twelve feet by ten feet and correspond to 120 miles by 120 miles by 40,000 feet of altitude from the airport surface volume of airspace. With a quarter inch spacing resolution of the lasers, the x-y matrix 14, providing light in the z direction, will have 576 lasers in each direction, for a total of 331,776; the y-z matrix 16, providing light in the x direction, and the x-z matrix 18, providing light in the y direction, will each have 576 by 480 lasers, for a total of 276,480. The total number of lasers for all of the planes is thus 884,746 for a resolution of 0.208 of a mile or 1,100 feet between lasers in the y and x direction and a resolution of 83.3 feet in the z direction. Typical minimum aircraft separation on approach or departure is three minutes. The typical air speed is 300 MPH. Thus, the minimum separation between aircraft in distance is 79, 200 feet, or 72 laser increments. The corresponding altitude resolution for this same example is 84 feet between lasers. Minimum separation between aircraft at adjacent altitudes is 1,000 feet or 12 laser increments. The acceptable resolution is based on the factors of distances and corresponding altitudes, separation minima, human factor visualization of the simulation display, cost and simulations space available trade off considerations.

Other applications may also employ the techniques of the present invention. The manufacturing industry may want to color code different parts of an article. For example, the automobile industry may want to model full size automobile bodies or parts thereof, in order to eliminate present clay modeling techniques.

In addition, the full size electronic media model simulation can be a direct data set source for producing parts directly from a computer aided design (CAD) tool with direct electronic coupling to computer aided manufacturing (CAM) numeric controlled N/C machine tools using established direct numerical control (DNC) techniques. The CAD/CAM coupling can be accomplished using an acceptable space volume point set describing a shape using commercially available solid modeling computer software techniques. Different colors may indicate different materials, different thicknesses, etc. The space volume point set is provided as formatted input to commercially available numerical control N/C language computer software. The processing output of the N/C language program is the input to a specific N/C post-processor computer program for a N/C machine. The post-processor output provides a part program data set that consists of commands that the N/C machine tool will accept to accurately machine and duplicate the desired shape.

The design and construction buildings, including major commercial buildings, can be 3D visualized by incorporating commercially available application design computer software with the DVDD of the present invention to 3D visually display various stages or processes of building construction. The segmented colorization techniques of the present invention may be used, for example, to illustrate what portions of the building have been completed, tenant layout, various areas of contractor responsibility, construction materials used, location of any special requirements, presenting all water pipes, gas pipes and electrical wiring in mutually different colors, etc. Existing 2D displays are relatively small in size compared to the DVDD of the present invention and it is not practical to view an entire building at once. Numerous zoomed or partitioned views are required to achieve sufficient information about the building. The DVDD of the present invention will, for example, allow detection of design error and interferences between various building subsystems prior to beginning construction. This well help to reduce on site construction change orders and the additional costs incurred thereby.

The medical community may enhance different displays for images from previously known techniques such as ultrasound and catscan. The image displayed may be scaled up or down or be accurately representational, depending on the image to be created and the size of the volume available.

The invention being thus described, it would be obvious that the same may be varied in many other ways. Such variations are not to be regarded as a departure from the spirit and scope of the invention, and also as modifications as would be obvious to one skilled in the art are intended to be included within the scope of the following claims.

What is claimed is:

1. A segmented direct volume display device comprising:
a volume containing a medium;
two mutually orthogonal matrices of light guns capable of providing light beams, each matrix outputting light at different wavelengths;
means for generating images in said volume by selectively activating said light guns, an image being formed at an intersection of two beams, one from each of said two matrices;
means for displaying images in different colors in different segments of said volume; and
means for altering an attribute of an image in response to a parameter of an object being imaged being exceeded.

2. The segmented direct volume display device as recited in claim 1, further comprising, on display planes of said volume, a filter for blocking out light output from said light guns while allowing viewing of said image.

3. The segmented direct volume display device as recited in claim 1, further comprising individual filters, external to said volume, for each segment, said individual filters blocking out light from images in other segments while allowing viewing of a generated image within a corresponding segment.

4. The segmented direct volume display device as recited in claim 1, wherein said attribute is color and means for altering includes means for altering a color of an image in response to a predetermined threshold of a parameter of an object being imaged being exceeded.

5. The segmented direct volume display device as recited in claim 1, wherein said means for altering includes means for flashing an image in response to a predetermined threshold of a parameter of an object being imaged being exceeded.

6. The segmented direct volume display device as recited in claim 1, further comprising a third mutually orthogonal matrix of light guns outputting light at a wavelength different from wavelengths output from said two mutually orthogonal matrices, an image being formed at the intersection of three beams, one from each of the three matrices.

7. A segmented direct volume display device comprising:
a volume containing a medium;
two mutually orthogonal matrices of light guns capable of providing light beams, each matrix outputting light at different wavelengths;
means for generating images in said volume by selectively activating said light guns, an image being formed at an intersection of two beams, one from each of said two matrices;

means for displaying images in different colors in different segments of said volume; and means for altering a wavelength output by light guns in at least one of said two mutually orthogonal matrices in accordance with the position of the light gun within the matrix.

8. A method of segmenting a three dimensional image comprising:

selectively activating a light beam in each of two mutually orthogonal matrices of light guns, each matrix outputting light at different wavelengths;

projecting said light beams within an enclosed volume;

forming an image at an intersection of two beams, one from each of said two matrices;

generating images in different colors in different segments of said volume; and altering an attribute of an image in response to a parameter of an object being imaged being exceeded.

9. The method as recited in claim 8, further comprising blocking out light output from said light guns.

10. The method as recited in claim 8, further comprising individually filtering light from a corresponding segment to a corresponding user, said individual filtering blocking out light from images in other segments while allowing viewing of a generated image within said corresponding segment.

11. The method as recited in claim 8, wherein said altering step includes altering a color of an image in response to a predetermined threshold of a parameter of an object being imaged being exceeded.

12. The method as recited in claim 8, wherein said altering step includes flashing an image in response to a predetermined threshold of a parameter of an object being imaged being exceeded.

13. The method as recited in claim 8, further comprising selectively activating a light beam in a third mutually orthogonal matrix of light guns, said third mutually orthogonal matrix outputting light at a wavelength different from wavelengths output from said two mutually orthogonal matrices, said forming of an image being at the intersection of three beams, from each of the three matrices.

14. A method of segmenting a three dimensional image comprising:

selectively activating a light beam in each of two mutually orthogonal matrices of light guns, each matrix outputting light at different wavelengths;

projecting said light beams within an enclosed volume;

forming an image at an intersection of two beams, one from each of said two matrices;

generating images in different colors in different segments of said volume; and altering a wavelength output by light guns in at least one of said two mutually orthogonal matrices in accordance with the position of the light gun within the matrix.

15. The method as recited in claim 8, further comprising outputting said generated images to a machine tool.

16. The method as recited in claim 8, wherein said selectively activating step is performed in response to data from an air traffic control system.

17. The method as recited in claim 8, wherein said selectively activating step is performed in response to data from CAD/CAM software.

18. The method as recited in claim 8, wherein said selectively activating step is performed in response to data from building design software.

19. The method as recited in claim 8, wherein said selectively activating step is performed in response to data from medical imaging software.

* * * * *